(12) United States Patent
Rampal et al.

(10) Patent No.: US 7,782,841 B2
(45) Date of Patent: Aug. 24, 2010

(54) METHOD AND SYSTEM FOR TRANSPORTING DATA USING PSEUDOWIRE CIRCUITS OVER A BRIDGED NETWORK

(75) Inventors: Sanjeev Rampal, Cary, NC (US);
Jimmy Ervin, Raleigh, NC (US);
Norman Finn, Livermore, CA (US);
Michael Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1217 days.

(21) Appl. No.: 11/029,708

(22) Filed: Jan. 5, 2005

(65) Prior Publication Data
US 2006/0146832 A1 Jul. 6, 2006

(51) Int. Cl.
*H04L 12/28* (2006.01)
*H04L 12/56* (2006.01)
*H04J 3/24* (2006.01)

(52) U.S. Cl. ............... 370/352; 370/392; 370/395.53; 370/401; 370/474; 709/228; 709/238

(58) Field of Classification Search .......... 370/351, 370/389, 392, 385.53, 395.3, 401, 474; 709/227, 709/228, 238
See application file for complete search history.

(56) References Cited
U.S. PATENT DOCUMENTS 7,339,929 B2 * 3/2008 Zelig et al. ............ 370/390
2004/0156313 A1 * 8/2004 Hofmeister et al. ...... 370/229
2005/0220148 A1 * 10/2005 DelRegno et al. ....... 370/498
2006/0109802 A1 * 5/2006 Zelig et al. ............. 370/258

OTHER PUBLICATIONS

Bryant, Stewart, "PWE3 Architecture", Internet Draft, Sep. 2004, Pseudo-Wire Edge-to-Edge, 42 pages.
Kawa, Claude et al., "Frame Relay Over Pseudo-Wires", Internet Draft, Aug. 2004, PWE3 Working Group, 25 pages.
Lau, J., et al., "Layer Two Tunneling Protocol (Version 3) L2TPv3", Internet Draft, Jun. 2002, Network Working Group, 68 pages.
Martini, Luca et al., "Encapsulation Method for Transport of Ethernet Frames Over IP/MPLS Networks", Internet Draft, Aug. 2002, Network Working Group, 19 pages.
Martini, Luca et al., "Encapsulation Method for Transport of Ethernet Frames Over IP/MPLS Networks", Internet Draft, Sep. 2004, Network Working Group, 20 pages.

* cited by examiner

*Primary Examiner* — Daniel J. Ryman
*Assistant Examiner* — Nishant B Divecha
(74) *Attorney, Agent, or Firm* — Cindy Kaplan

(57) ABSTRACT

A method for data communication across a layer 2 bridged network having two or more edge nodes configured for receiving and transmitting multiprotocol data packets. The method includes creating a pseudowire circuit across the bridged network, receiving data packets at one of the edge nodes, encapsulating data packets into pseudowire frames, encapsulating the pseudowire frames inside MAC frames, and transmitting the encapsulated frames over the carrier bridged network.

23 Claims, 5 Drawing Sheets

US 7,782,841 B2

METHOD AND SYSTEM FOR TRANSPORTING DATA USING PSEUDOWIRE CIRCUITS OVER A BRIDGED NETWORK

BACKGROUND OF THE INVENTION

The present invention relates generally to communication networks, and more specifically, to a technique for setting up pseudowire based circuits over a bridged network.

Pseudowire technology is currently used to create virtual wires which can be used for VPLS and frame relay transport over an IP or MPLS network. Pseudo Wire Emulation Edge-to-Edge (PWE3) emulates the essential attributes of a telecommunication service over a PSN (packet switched network). PWE3 provides only the minimum necessary functionality to emulate the wire with the required degree of accuracy for a given service. Pseudowire technology operates to encapsulate service-specific bit-streams, cells or PDUs (protocol data units) arriving at an ingress port, and carry them across an IP path or MPLS tunnel. Pseudowire may also be used to perform other operations such as managing timing and order to emulate the behavior and characteristics of the service to the required degree of accuracy. From the perspective of customer edge equipment, the pseudowire is an unshared link or circuit of the service.

Conventional use of pseudowire based circuits includes MPLS or L2TPV3 and techniques such as MAC in MAC, which is an alternative tunneling technology. Methods for transporting layer 2 packets over high-performance networks are described, for example, by Martini et al., in "Encapsulation Methods for Transport of Ethernet Frames Over IP/MPLS Networks" (IETF draft-ietf-ethernet-encap-00.txt, August, 2002), which is incorporated herein by reference. The term "layer 2" refers to the second layer in the protocol stack defined by the Open Systems Interface (OSI) model, also known as the logical link, data link, or MAC layer. This draft defines methods for encapsulating Ethernet traffic for transportation over IP networks using MPLS or other tunneling methods, such as Generic Routing Encapsulation (GRE). Ethernet LANs are connected to the IP network by provider edge devices, which are linked together by tunnels through the IP network. The sending provider edge device receives Ethernet frames from a customer edge device on the source LAN. It encapsulates the frames in packets with the label stack required for transmitting packets through the appropriate tunnel to the receiving provider edge device.

L2TPV3, described by Townsley et al in "Layer Two Tunneling Protocol (Version 3) 'L2TPv3'" (IETF draft-ietf-12tpext-12tp-base-04.txt, November, 2002), which is incorporated herein by reference, is another technique for tunneling layer-2 packets over IP networks, which can be used to carry Ethernet packets within a provider network.

A drawback to these conventional pseudowire techniques using MPLS or L2TPV3 is that they require the use of a layer 3/IP network for setting up pseudowire circuits, thus there are no provisions for establishing pseudowire circuits over a pure layer 2 bridged network. A drawback for MAC in MAC is that it can only be used for Ethernet devices and requires Ethernet frame formats. These are significant constraints in cases where a layer 3/IP network or Ethernet frames cannot be used and yet the advantages of pseudowire technology are desired.

There is, therefore, a need for a system and method for using pseudowire technology without requiring the use of a layer 3/IP network for setting up the pseudowire circuits. It is also desirable that the system and method work for multiple types of clients and do not require new Ethernet frame formats.

SUMMARY OF THE INVENTION

A method for data communication across a layer 2 bridged network having two or more edge nodes configured for receiving and transmitting multiprotocol data packets is disclosed. The method includes creating a pseudowire circuit across the bridged network, receiving data packets at one of the edge nodes, encapsulating data packets into pseudowire frames, encapsulating the pseudowire frames inside MAC frames, and transmitting the encapsulated frames over the carrier bridged network.

The system is configured to allow pseudowire technology on networks without a layer 3/IP network or networks which do not use an Ethernet frame format. The network may be a pure bridged based network or may include MAC bridges overlaid on non-IP transport elements, including optical and ATM transport elements. The data packets may be, for example, frame relay or Ethernet packets.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DETAILED DESCRIPTION OF THE INVENTION

Figure 1:
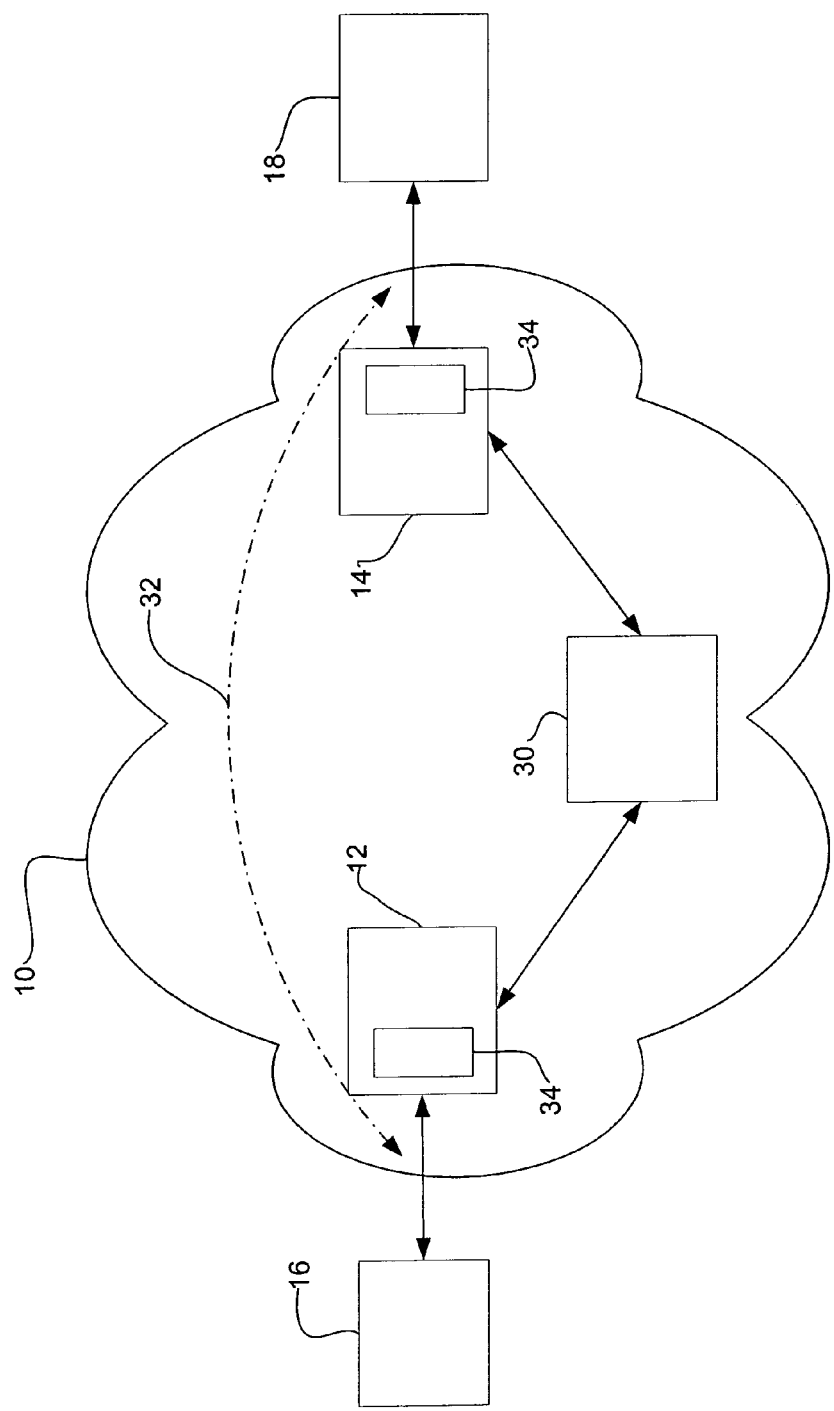
FIG. 1 is a schematic illustrating a network utilizing a pseudowire based circuit over a bridged network.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method for providing pseudowire based circuits over a bridged network are described herein. The system provides the benefits of using pseudowire technology without requiring a layer 3/IP network. The system can be used with different technologies that pseudowire technology currently supports (e.g., Ethernet, Frame Relay, ATM). As described further below, the system leverages the benefits of bridging technology in an environment where circuit provisioning is the primary mode of defining services. The system is well suited for carrier architecture where the provisioning and billing infrastructure is set up to use the notion of circuits but cannot handle the complexity and lack of carrier class features in a layer 3/IP network. The system is more scalable in the control plane than systems involving direct MPLS based pseudowires, since only source and destination bridges need to be configured to set up a service, rather than every switch along the path. The system is also more scalable in the data plane than systems involving direct MPLS based pseudowires in terms of the amount of information and state needed in the network to support a number of end user services.

The present invention operates in the context of a data communication network including multiple network elements. Some of the elements in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, a hardware assisted forwarding engine, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. Memory can be non-volatile RAM and/or ROM. However, there are many different ways in which memory could be coupled to the system. In an alternative embodiment, a router or switch may be implemented on a general purpose network host machine such as a computer system.

Figure 2:
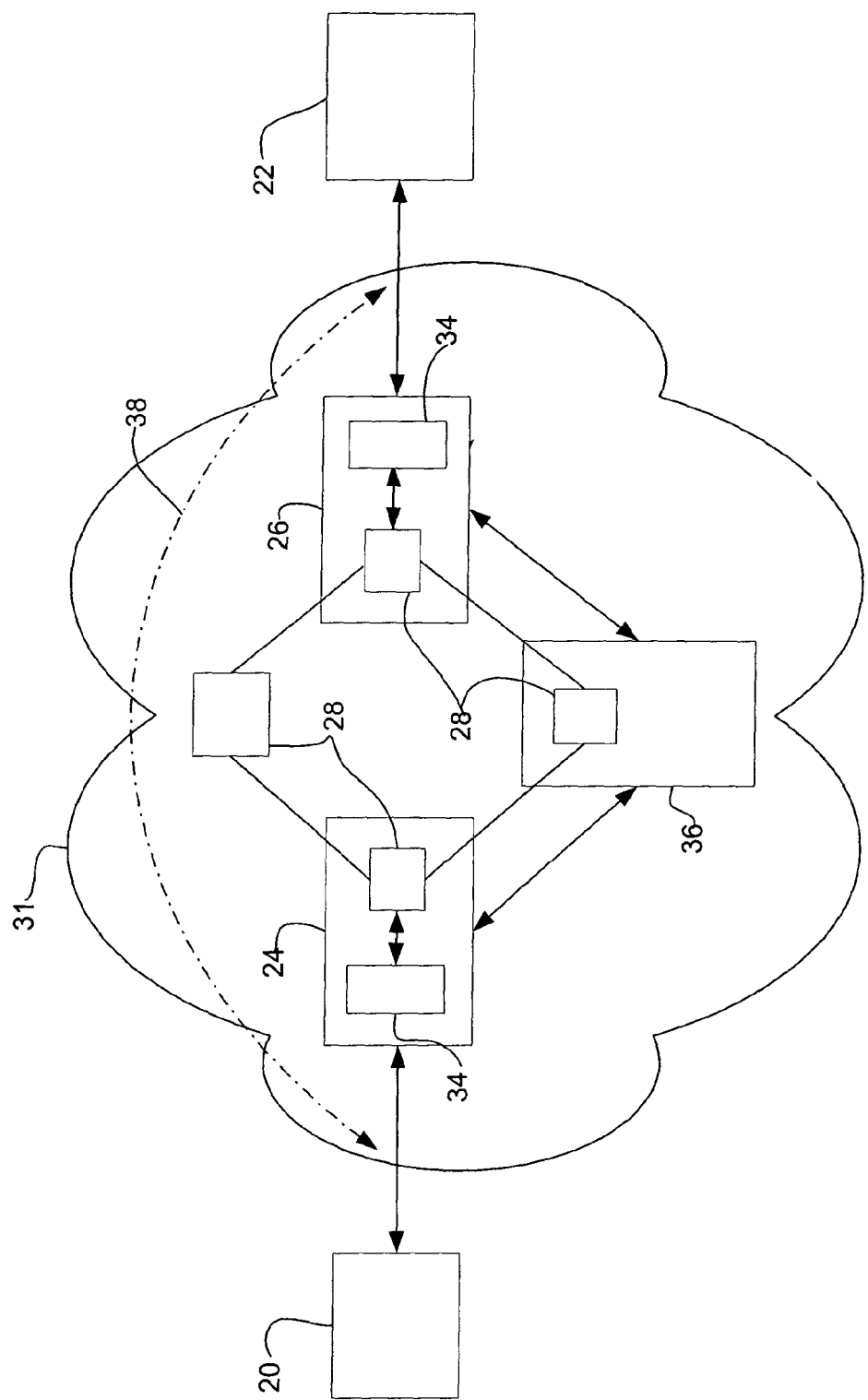
FIG. 2 is a schematic illustrating a network utilizing a pseudowire based circuit over an optical network.

FIG. 1 illustrates a transport network utilizing the system described herein. The system may be used for example, in Local Area Networks (LANs) connected together using Media Access Control (MAC) bridges. The MAC bridge functions within the Logical Link Control (LLC) sublayer of the network layer and includes two or more MAC devices that interconnect the bridge ports to respective LANs. The network may be a pure bridge based network or the network may include MAC bridges overlaid on optical transport elements (as shown in FIG. 2). The network may be a carrier bridged network 10 made up of carrier owned bridging devices including a source carrier bridge 12 and a destination carrier bridge 14, as shown in FIG. 1, for example. The source and destination carrier bridge nodes 12, 14 are in communication with frame relay client nodes 16, 18, respectively. A pseudowire circuit 32 is created between carrier edge nodes 12 and 14. The edge nodes 12, 14 are modified to incorporate a client adaptation and encapsualtion/decapsulation function (described below), which is used in transporting data over the pseudowire circuit 32. The frame relay nodes 16, 18, may be conventional routers or switches, as previously described.

FIG. 2 illustrates the transport of data over a carrier optical network 31. Frame relay nodes 20, 22 and carrier bridge edge nodes 24, 26 are implemented as in FIG. 1 and the backbone network is a conventional carrier optical network such as SHD, SONET, or OTN, utilizing conventional optical components 28 to deliver data.

It is to be understood that the networks shown in FIGS. 1 and 2 are only examples and that the network may include many more edge nodes 12, 14, 24, 26 and intermediate nodes 30, 36. There may also be more than one pseudowire circuit 32, 38 between carrier edge nodes 12, 14 and 24, 26.

Referring again to FIG. 1, the source and destination carrier bridge nodes 12, 14 are configured to provide one or more pseudowire circuits 32 on behalf of their respective frame relay clients 16, 18 to enable the clients to communicate over the carrier bridged network 10. The pseudowire circuit 32 is a point-to-point connection between the carrier bridge edge nodes 12, 14 and is used to forward multiprotocol data packets. The data packet may be, for example, an HDLC packet, or other type of data packet. The pseudowire circuit 32 originates and terminates on the carrier edge nodes 12, 14 and traffic over the pseudowire circuit 32 is invisible to the core network. The pseudowire circuit 10 is operable to encapsulate circuit data arriving at a carrier edge node 12, 14 from the client node 16, 18, respectively. The encapsulated data is then carried across a bridge. Signaling, timing, order, or other aspects of the service is managed at the boundaries of the pseudowire circuit 32. As described in detail below, data is encapsulated in a pseudowire PDU and carried across the underlying network via the pseudowire path. The source and destination carrier bridge nodes 12, 14 perform the necessary encapsulation and decapsulation of pseudowire PDUs.

As illustrated in FIG. 1, the system sets up the pseudowire circuit 32 directly within the carrier bridged network 10. In one example, data flow (e.g., layer 2 frames) received from frame relay client 16, enters the carrier bridged network 10 at source carrier bridge 12. Upon receiving an incoming data packet, source carrier bridge 12 encapsulates the data packet and sends the packet across the pseudowire circuit set up within the carrier bridged network 10. When the packet reaches the destination carrier bridge 14 at the egress, the node removes the label and transmits the packet to the frame relay client 18.

The carrier bridged network 10 is modified so that the carrier bridge nodes 12, 14 include an adaptation function in which the frames received by the client are encapsulated into pseudowire frames. The client adaptation function interface turns client PDUs (e.g., Ethernet/Frame, Relay/ATM) into pseudowire PDUs. These pseudowire PDUs are the payload for carrier bridged MAC frames, which serve to transport the pseudowire PDUs to the destination carrier bridge where the adaptation function uses the pseudowire label to forward the original client PDU to the destination client interface. The frames received may be Ethernet or other types of frames (e.g., frame relay).

Figure 3:
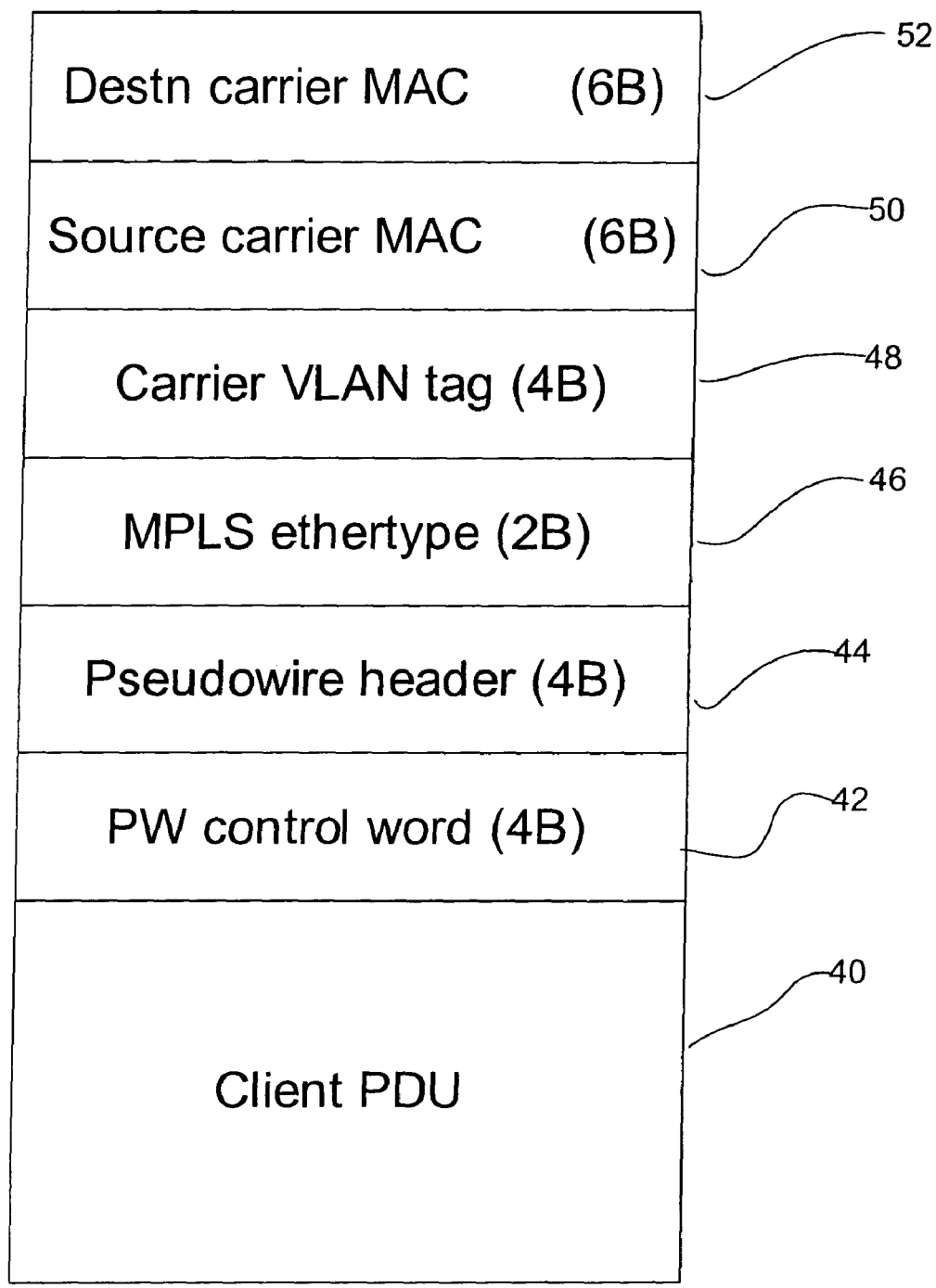
FIG. 3 illustrates an encapsulated frame for use in transmitting data over the pseudowire based circuit.

The pseudowire frames are further encapsulated inside special MAC frames, which are constructed using information about the source and destination carrier bridge nodes 12, 14, as well as other factors such as the traffic engineering functions being performed in the carrier network 10. As shown in FIG. 3, the encapsulation results in a client PDU 40 inside a pseudowire header (VC label and control word) inside a carrier MAC header, which may be referred to as "PW-in-MAC". It is to be understood that the fields, number of bits, and format shown in FIG. 3 are only one example, and that the encapsulation scheme may be different than shown and described herein without departing from the scope of the invention.

The specific fields of the encapsulated frame include the client PDU 40, pseudowire control word 42, pseudowire header 44, MPLS ethertype 46, carrier VLAN tag 48, source carrier MAC address 40 and destination carrier MAC address 52 (FIG. 3). The client PDU 40 is the original frame relay packet received at the carrier bridge edge node 12, 14 from the frame relay client 16, 18. The pseudowire control word 42 and pseudowire header 44 are the same as used in PWE3. Details of the pseudowire header structure for PWE3 are described by Bryant et al. in an IETF draft entitled "Protocol Layering in PWE3" (IETF draft-ietf-pwe3-protocol-layer-00.txt, May, 2002), which is incorporated herein by reference. The pseudowire control word 42 is optional and carries information used by the encapsulation layer.

The MPLS ethertype 46, carrier VLAN tag 48, source carrier MAC address 50, and destination carrier MAC address 52 fields are provided in the layer 2 header. The VLAN tag 48 is optional. A virtual connection (VC) label is added in the form of the MPLS header. The source MAC address is the address of the source carrier bridge 12 and the destination MAC address is that of the destination carrier bridge 14 (FIG. 1). The carrier MAC addresses allow a frame to get switched from ingress to egress. The address may represent carrier bridge IDs or bridge ports, for example.

The system is preferably capable of statically provisioning pseudowire tags on the bridges. However, alternate techniques such as the use of special signaling protocols (e.g., LDP, GVRP) may also be used as long as they do not need a layer 3/IP network to exist in order to function.

Figure 4:
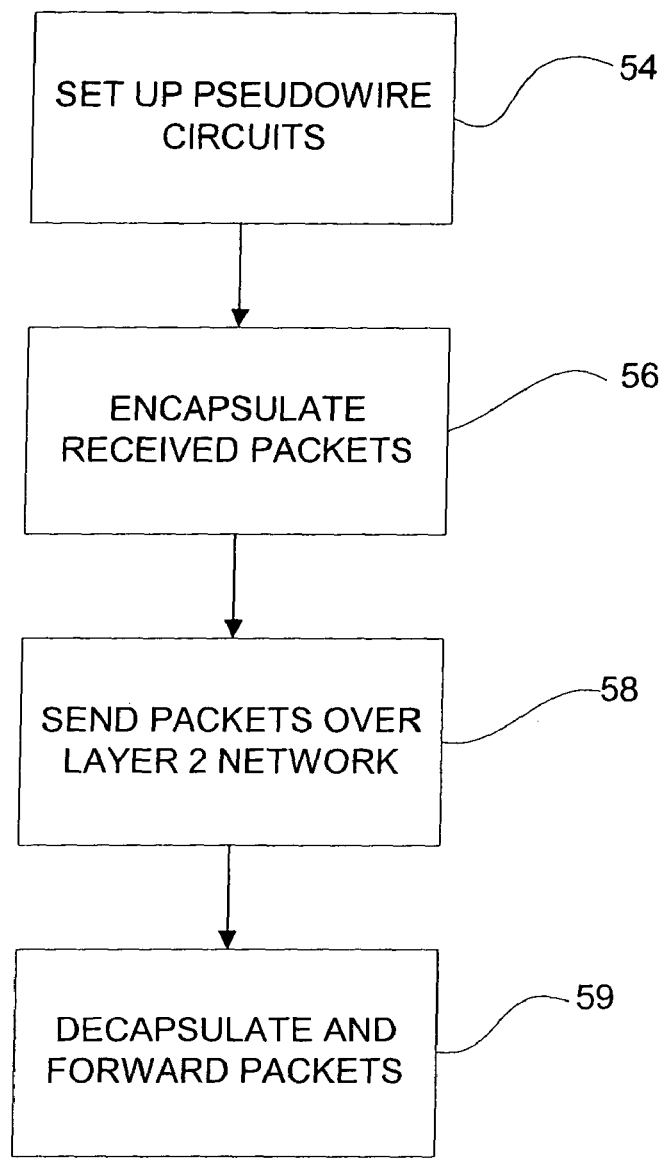
FIG. 4 is a flowchart illustrating a process for transferring data over a bridged network utilizing pseudowire circuits.

FIG. 4 is a flowchart illustrating a process of the present invention for transporting data on a pseudowire circuit over a bridged network. One or more pseudowire circuits are set up at edge points of the carrier bridged network 10 (step 54). As described above, the edge nodes 12, 14 include an adaptation function which operates to encapsulate and decapsulate frames (FIG. 1). Upon receiving a packet (e.g., frame relay, Ethernet, ATM), from the frame relay client 16 at the source carrier bridge 12, the packet is encapsulated into a pseudowire PDU (step 56). The frames are then bridged over the carrier network 10 towards the destination carrier bridge 14 (step 58). At the destination bridge 14, the carrier MAC encapsulation is removed, the pseudowire frame extracted, and the pseudowire tag is used to decide which outgoing interface to forward the client frame encapsulated inside the pseudowire frame (step 59). The pseudowire tag is also used for any other forwarding decisions such as QoS treatment for the customer frame on the outbound link.

Figure 5:
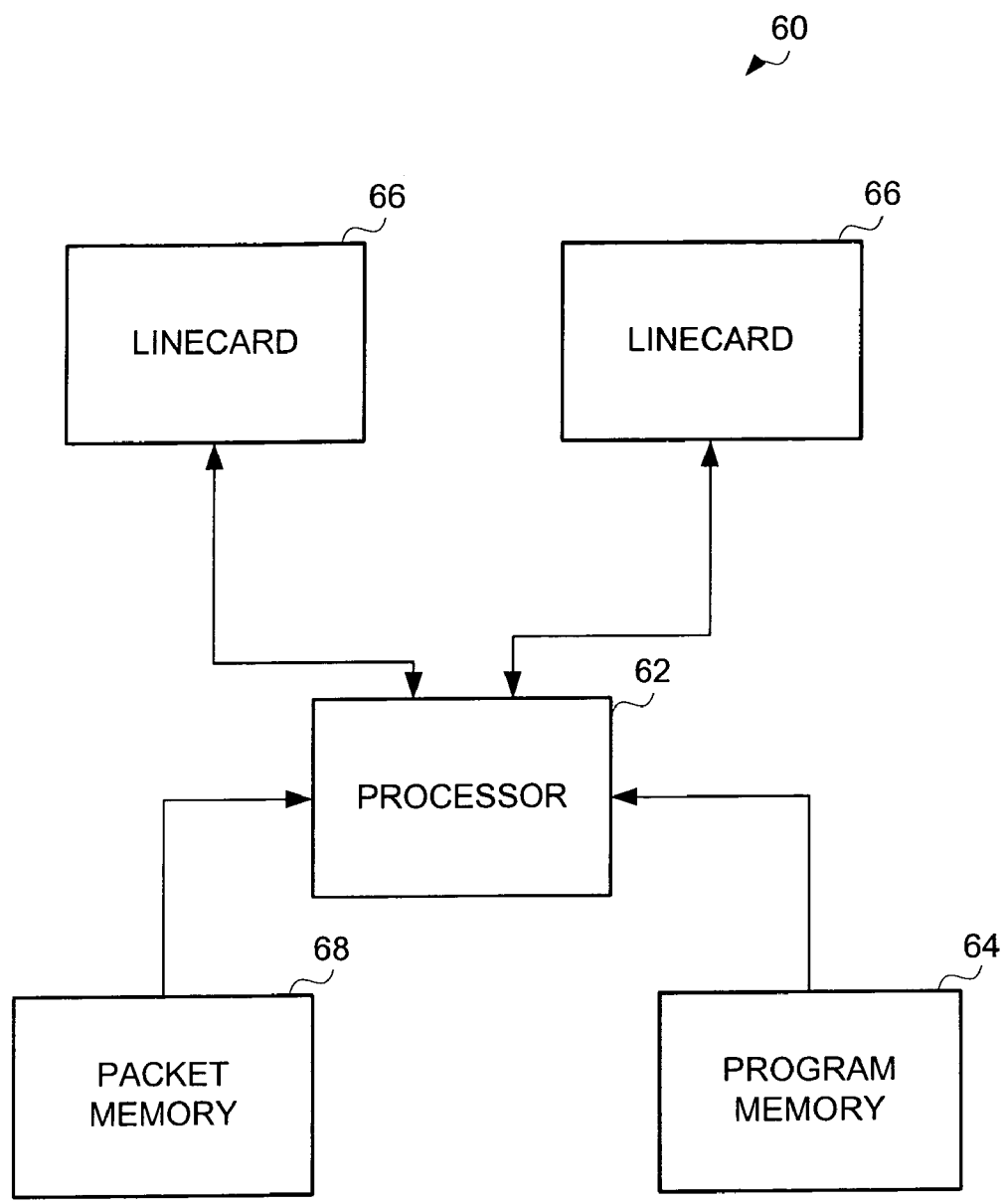
FIG. 5 is a block diagram of one example of a network device for use in implementing embodiments of the present invention.

FIG. 5 depicts a network device 60 that may be used to implement the method and system described above. In one embodiment, network device 60 is a programmable machine that may be implemented in hardware, software, or any combination thereof. A processor 62 executes code stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. Network device 60 implements all of the features provided by the present invention.

Packet transmission operations may occur partially or completely within one of linecards 66. To implement functionality according to the present invention, linecards 66 may incorporate processing and memory resources similar to those discussed above in connection with the network device as a whole.

Network device 60 shown in FIG. 5 is only one example of a computer system suitable for use with the invention. Other devices and systems having different configurations of subsystems may also be utilized. Communication between computers within the network is made possible with the use of communication protocols, which govern how computers exchange information over a network.

As can be observed from the foregoing, the system and method described herein have many advantages. The system and method provide the benefits of using pseudowire technology without requiring a layer 3/IP network. This allows, for example, for a carrier to use their existing provisioning, management, and billing software (OSS) to provision pseudowire services in the same manner that they currently do for optical circuit services. Since conventional pseudowire services are built on IP networks, it would be more difficult for a carrier to provision, manage, and bill because the carrier's OSS cannot handle IP networks.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for transmitting and receiving data communication across a layer 2 bridged network comprising a plurality of edge nodes, the method comprising:
   creating a pseudowire circuit across the layer 2 bridged network, the pseudowire circuit comprising a point-to-point connection;
   receiving data packets at one of said plurality of edge nodes, said edge node configured for receiving and transmitting multiprotocol data packets;
   converting said data packets into pseudowire frames;
   encapsulating at said edge node, said pseudowire frames inside MAC frames, a payload of the MAC frame comprising said pseudowire frame;
   transmitting from said edge node, said encapsulated frames across the pseudowire circuit in the layer 2 bridged network; and
   receiving at said edge node, another pseudowire frame encapsulated in a MAC frame, extracting said another pseudowire frame, and selecting an outgoing interface at said edge node based on a pseudowire tag in said another pseudowire frame;
   wherein said pseudowire circuit is created and said encapsulated frames are transmitted across the layer 2 bridged network using only a layer 2 control plane, without the use of a layer 3 network.

2. The method of claim 1 wherein encapsulating said data packets comprises inserting a source bridge node MAC address and a destination bridge node MAC address into each of said packets.

3. The method of claim 1 wherein the data packets received at said one of said plurality of edge nodes are frame relay packets.

4. The method of claim 1 wherein the data packets received at the edge node are Ethernet packets.

5. The method of claim 1 wherein the bridged network comprises non-IP transport elements.

6. The method of claim 5 wherein the bridged network comprises optical transport elements.

7. The method of claim 5 wherein the bridged network comprises ATM transport elements.

8. The method of claim 1 further comprising provisioning pseudowire tags on said plurality of edge nodes.

9. The method of claim 1 wherein encapsulating said data packets comprises inserting traffic engineering information into the packets.

10. The method of claim 1 wherein encapsulating said data packets comprises inserting a virtual connection label.

11. A computer-readable tangible storage medium encoded with a computer program for data communication across a layer 2 bridged network comprising a plurality of edge nodes, the computer program comprising:

code that creates a pseudowire circuit across the layer 2 bridged network, the pseudowire circuit comprising a point-to-point connection;

code that receives data packets at one of said plurality of edge nodes, said edge node configured for receiving and transmitting multiprotocol data packets;

code that converts said data packets into pseudowire frames;

code that encapsulates said pseudowire frames inside MAC frames, a payload of the MAC frame comprising said pseudowire frame;

code that transmits said encapsulated frames across the pseudowire circuit in the layer 2 bridged network; and code that receives another pseudowire frame encapsulated in a MAC frame, extracts said another pseudowire frame, and selects an outgoing interface based on a pseudowire tag in said another pseudowire frame;

wherein said pseudowire circuit is created and said encapsulated frames are transmitted across the layer 2 bridged network using only a layer 2 control plane, without the use of a layer 3 network.

12. The computer-readable storage medium of claim 11 wherein code for encapsulating said data packets comprises code for inserting a source bridge node MAC address and a destination bridge node MAC address into each of said packets.

13. The computer-readable storage medium of claim 11 wherein the data packets received at said one of said plurality of edge nodes are frame relay packets.

14. The computer-readable storage medium of claim 11 wherein the data packets received at the edge node are Ethernet packets.

15. The computer-readable storage medium of claim 11 wherein the bridged network comprises non-IP transport elements.

16. The computer-readable storage medium of claim 11 further comprising code that provisions pseudowire tags on said plurality of edge nodes.

17. A system for transporting data across a layer 2 bridged network comprising a plurality of edge nodes, the system comprising:

means for creating a pseudowire circuit across the layer 2 bridged network, the pseudowire circuit comprising a point-to-point connection;

means for receiving data packets at one of said plurality of edge nodes, said edge node configured for receiving and transmitting multiprotocol data packets;

means for converting said data packets into pseudowire frames;

means for encapsulating said pseudowire frames inside MAC frames, a payload of the MAC frame comprising said pseudowire frame;

means for transmitting said encapsulated frames across the pseudowire circuit in the layer 2 bridged network; and means for receiving at said edge node, another pseudowire frame encapsulated in a MAC frame, extracting said another pseudowire frame, and selecting an outgoing interface at said edge node based on a pseudowire tag in said another pseudowire frame;

wherein said pseudowire circuit is created and said encapsulated frames are transmitted across the layer 2 bridged network using only a layer 2 control plane, without the use of a layer 3 network.

18. The system of claim 17 wherein means for encapsulating said data packets comprises inserting a source bridge node MAC address and a destination bridge node MAC address into each of said packets.

19. The system of claim 18 wherein only a source bridge node and a destination bridge node are modified to create the pseudowire circuit.

20. The system of claim 17 further comprising means for provisioning, management, and billing utilizing OSS for the pseudowire circuit.

21. The system of claim 17 wherein the data packets are HDLC packets.

22. A communications network comprising a source bridge node and a destination bridge node in a layer 2 carrier bridged network, each of said bridge nodes configured for receiving and transmitting multiprotocol data packets and creating a pseudowire circuit between the source bridge node and the destination bridge node, the pseudowire circuit comprising a point-to-point connection, wherein said source bridge node comprises a processor operable to convert data packets into pseudowire frames, encapsulate said pseudowire frames inside MAC frames, a payload of the MAC frame comprising said pseudowire frame, transmit said encapsulated frames over the carrier bridged network, and receive another pseudowire frame encapsulated in a MAC frame, extract said another pseudowire frame, and select an outgoing interface based on a pseudowire tag in said another pseudowire frame; wherein said pseudowire circuit is created and said encapsulated frames are transmitted across the layer 2 bridged network using only a layer 2 control plane, without the use of a layer 3 network.

23. The network of claim 22 wherein said encapsulated frames include a source bridge node MAC address and a destination bridge node MAC address.

\* \* \* \* \*